(12) United States Patent
Lamberger

(10) Patent No.: US 9,730,506 B2
(45) Date of Patent: Aug. 15, 2017

(54) MIRROR FOR A MOBILE DEVICE

(71) Applicant: Geanine M. Lamberger, Furlong, PA (US)

(72) Inventor: Geanine M. Lamberger, Furlong, PA (US)

( * ) Notice: Subject to any disclaimer, the term of this patent is extended or adjusted under 35 U.S.C. 154(b) by 0 days.

(21) Appl. No.: 14/854,134

(22) Filed: Sep. 15, 2015

(65) Prior Publication Data

US 2016/0077401 A1 Mar. 17, 2016

Related U.S. Application Data

(60) Provisional application No. 62/050,980, filed on Sep. 16, 2014.

(51) Int. Cl.
| | |
|---|---|
| *G02F 1/03* | (2006.01) |
| *A45D 42/10* | (2006.01) |
| *G02B 5/08* | (2006.01) |
| *A45D 42/08* | (2006.01) |
| *A45D 42/24* | (2006.01) |

(52) U.S. Cl.
CPC .............. *A45D 42/10* (2013.01); *A45D 42/08* (2013.01); *G02B 5/0808* (2013.01); *A45D 42/24* (2013.01)

(58) Field of Classification Search
CPC ........ A45D 42/10; A45D 42/08; A45D 42/24; G02B 5/0808
USPC ............ 359/263, 245, 201.2, 318, 359, 449, 359/484.04; 349/113; 345/173
See application file for complete search history.

(56) References Cited

U.S. PATENT DOCUMENTS

| | | | | |
|---|---|---|---|---|
| 7,057,681 B2 * | 6/2006 | Hinata | .............. | G02F 1/133528 349/113 |
| 7,372,510 B2 * | 5/2008 | Abileah | .............. | G02F 1/13338 345/173 |
| 9,086,610 B2 * | 7/2015 | Shoemake | ............. | G03B 15/02 |

OTHER PUBLICATIONS

Smart Tint Website giving information about clingable switchfilm http://shop.smarttint.com/How-does-it-work-_b_500.html.
Roscoe Shrink Mirror Instructions.
Nanalux optical information about optically clear flexible plastic-silicone.
Wikipedia citation on One-Way (two way) mirrors.
Wikipedia citation on Mirrors.
Makeup Mirror from Google Play app store, showing one type of software mirror app available, but comments note that this app simply uses the front facing camera and is not a true mirror.
Wikipedia citation on Touch Screens.
Website explaining Liquid Crystal Display functioning http://www.physlink.com/education/askexperts/ae532.cfm.

\* cited by examiner

*Primary Examiner* — Tuyen Tra
(74) *Attorney, Agent, or Firm* — Karen Tang-Wai Sutton

(57) ABSTRACT

A mirror for a mobile device, the mirror configured as a flexible multilayered laminate electrostatically and removably adhered to a viewing screen or other smooth surface of the mobile device. The laminate has at least one reflective layer adhered to an optically transparent bottom layer made of a plastic-silicone material and the laminate includes a middle switchable film layer that when current is applied becomes optically opaque, allowing a split screen use of the viewing screen. For instance, when current is applied to the laminate, half of the viewing screen is a mirror and the other half allows use of software and other features of the mobile device.

7 Claims, 4 Drawing Sheets

MIRROR FOR A MOBILE DEVICE

CROSS REFERENCE TO RELATED APPLICATIONS

Reference is made to and priority claimed from U.S. provisional application Ser. No. 62/050,980 filed on 16 Sep. 2014.

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION BY REFERENCE OF MATERIAL SUBMITTED ON A COMPACT DISC OR AS A TEXT FILE VIA THE EFS WEB SYSTEM

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention pertains to the field of mirrors for use with electronic mobile devices. More particularly, the present invention pertains to a mirror for smartphones, tablets, MP3 players, and other mobile devices having a viewing screen.

Background Art

Smartphones, tablets, and other mobile, wireless devices with a glass viewing screen are found in all almost every pocket and purse in the United States, and the popularity of these devices is due to their wide range of functionality. Mobile devices today are both a source of entertainment, such as listening to music or watching a movie, and an all-in-one tool, providing the user turn by turn driving directions, calendar reminders for piano lessons, and portable camera for an impromptu shot at a friend's house. In particular, smartphones are particularly useful due to the vast array of "apps"—short software programs—that can be downloaded for free or for fee from the internet that add functional features to the smartphone. Apps hence allow us to consolidate the myriad gadgets we use every day into a single device.

Women in particular benefit from multi-functional mobile devices because they tend to have more small items to carry around. For instance, virtually every adult woman's purse contains a tube of lipstick, but not every woman has room in her purse for a mirror. Women are always looking for mirrors, and mirror-like objects for makeup application or hair checking during the day, and it is not always convenient to carry a mirror, because the mirror has to be of a certain size in order to be useful. Cosmetic purveyors have tried to fix this problem by applying mirrors to lipstick tubes, or with small mirrored compacts, etc. but these mirrors are irritatingly small, and they do not solve the second problem that goes hand in hand with a mirror: the need for good lighting. Any mirror, large or small in bad lighting is almost as bad as having no mirror at all. Bathrooms in restaurants and hotels are notoriously dark and ill-lit, rendering makeup touch-up or application impossible. Manhattan, for instance, is famous for its dimly lit restaurants, and its fashionable bathrooms are so dark it is hard to see any detail about one's face or clothing, forget about touch up one's eyeliner or blend concealer on a blemish. In particular, the rise of the "selfie"—the spur of the moment camera shot of the smartphone's user by the user him or herself—and the selfie's penchant for creating unflattering headshots, has made the lack of mirrors even more annoying.

The industry has responded with software applications that use the selfie camera as a makeshift mirror, but these apps are not true mirrors and simply record the viewer's image, then replay the image back to the viewer. Despite continuing innovations in recorded image technology, there is a time delay between capturing and playing the recorded image, and this delay makes application of makeup difficult because the visual information being displayed is slower than the actual physical act being performed in real time, and as such, performing precision acts, like applying mascara, is tortuous due to the camera's time delay. The viewer's hand is not doing what the viewer's eyes see at the same time. Further, the poor lighting problem is not solved by the selfie camera, which cannot augment the lighting around the viewer's face sufficiently to allow task work to be done with confidence.

Cameras and other capture/playback technology thus are so far poor substitutes for true mirrors. The term "true mirror" here means a mirror that reflects back to the viewer a specular reflection without image distortion. There are two basic types of true mirrors: conventional and two-way.

Conventional mirrors, are made of glass or some other smooth, rigid optically transparent material having a reflective coating adhered to the backside of the glass or other optically transparent material. When light hits the mirror, it can neither pass through the reflective coating nor be absorbed by it, and thus must be reflected. The shiny backing does not scatter light to create a diffuse reflection but rather light contacting the smooth surface creates a specular reflection, and a resulting image seen in the mirrored surface is a "light print", a reversing of "front and back" of the image in the mirrored surface versus the real image. The light is reflected because the mirror is electrically conductive: since light is an electromagnetic field, when it contacts the mirror the metal coating cancels out the electric field parallel to the mirror, causing the light to change direction and reflect away.

Two-way mirrors function slightly differently from conventional mirrors. A light-porous yet reflective surface is applied to the front side of an optically transparent medium, such as glass. The two-way mirror is then positioned so as to be able to separately control the amount of light on the front side of the mirror as well as on the back side. For the front side to serve as a mirror, lighting on this side must be relatively brighter than lighting on the back side. When the two-way mirror is a window in a wall separating two rooms, the front room has the reflective side of the mirror, and a back room has the back side of the mirror. The back room must be darker and the front room brighter in order for the reflective side to serve as a mirror and for people in the back room to be able to see through the mirror and view on goings in the front room. If the back room has more light than the front room, the light from the back room is transmitted to the front room through the porous reflective surface and thus visually cancels out the reflective light from the front of the mirror. When the back room is dark, only the reflected light is seen by the viewer in the front room, hence a mirror effect is created. It should be noted that unless the front room is very brightly lit, the mirror image created is visually darker than that created by a conventional mirror. While not perfect, the two-way mirror still provides a specular reflection that shows movements, etc. in real time far superior to any recording/playback images now available, but cannot augment ambient light.

What is needed is a true mirror for a mobile device, where the viewing screen or another portion of the smartphone is adapted for use as a true mirror which reflects the viewer's image in real time, and which can also be illuminated so as to improve the user's ability to see his or her image in the viewing screen.

DISCLOSURE OF INVENTION

The invention of a first part is a software application that adapts a visual screen of a smartphone, tablet, or other mobile device into a true mirror. In another embodiment, the software application incorporates light around a perimeter of a true mirror portion of the screen so as to eliminate shadows that otherwise may be caused by overhead or otherwise poor lighting conditions. In yet another embodiment, the software application incorporates light in regions of the mirror portion and which can be selectively turned on or off.

The invention of a second part is a mirror laminate provided as a flexible film applied to the visual screen or other portion of the mobile device that serves as a true mirror. In still yet another embodiment, the software application for the mirror can be accessed easily from a camera application on the mobile device, and the user can easily switch between the mirror and the so-called "selfie" application which allows the users to take pictures of himself or herself.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

Figure 1:
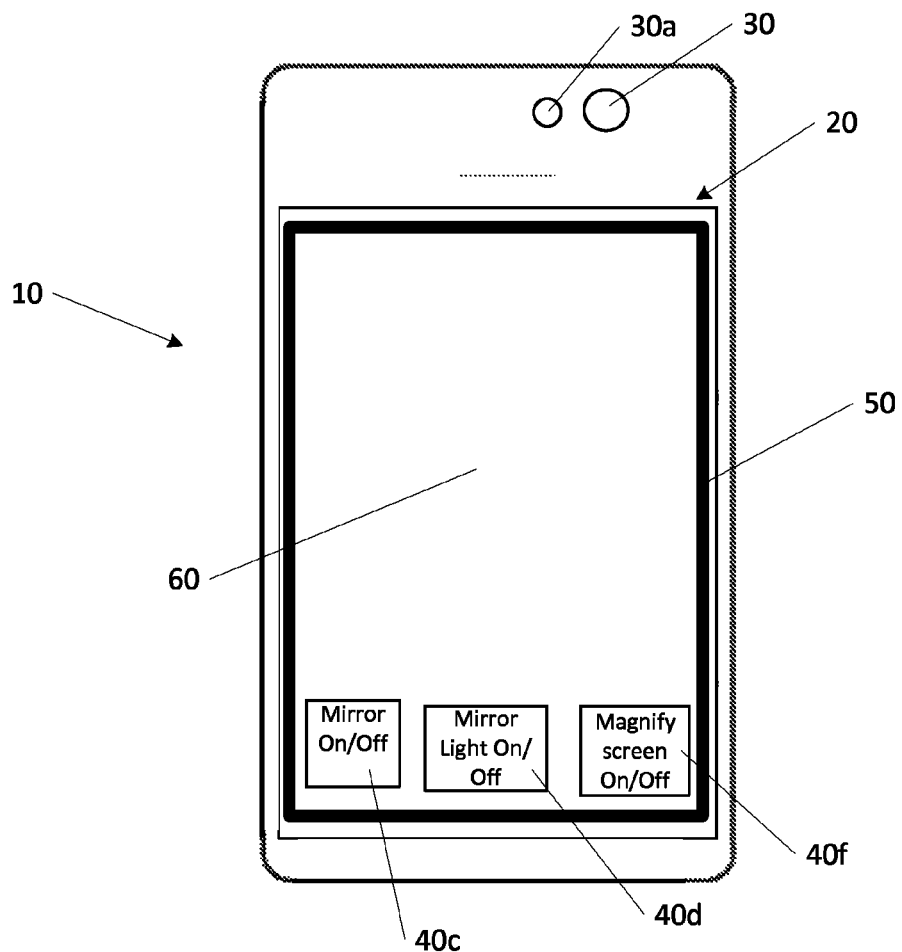
FIG. 1 is a perspective view of a smartphone mobile device, showing controls for the mirror application, and the array of lights along the periphery of the mirror portion of the smartphone.

The following is a list of reference labels used in the drawings to label components of different embodiments of the invention, and the names of the indicated components.
10 mobile device
20 viewing screen
22 touch screen
30 front facing camera
30*a* front facing flash (for camera)
30*aa* aperture for back facing flash
32 back facing camera aperture
40*a* on/off control
40*b* home page
40*c* mirror on/off control
40*d* light on/off control
40*e* back of mobile device case
40*f* magnify
40*g* conversion of viewing screen background
50 light array
60 mirror or reflective surface
62 data store for mirror application software
70 mirror laminate
72 top layer
74 middle layer
76 bottom layer (flexible plastic-silicone)
78 on/off control for power to the switchable film
80 LED array
82 LED
84 power means
86 on/off control for power to the LED array

DETAILED DESCRIPTION

Figure 2A:
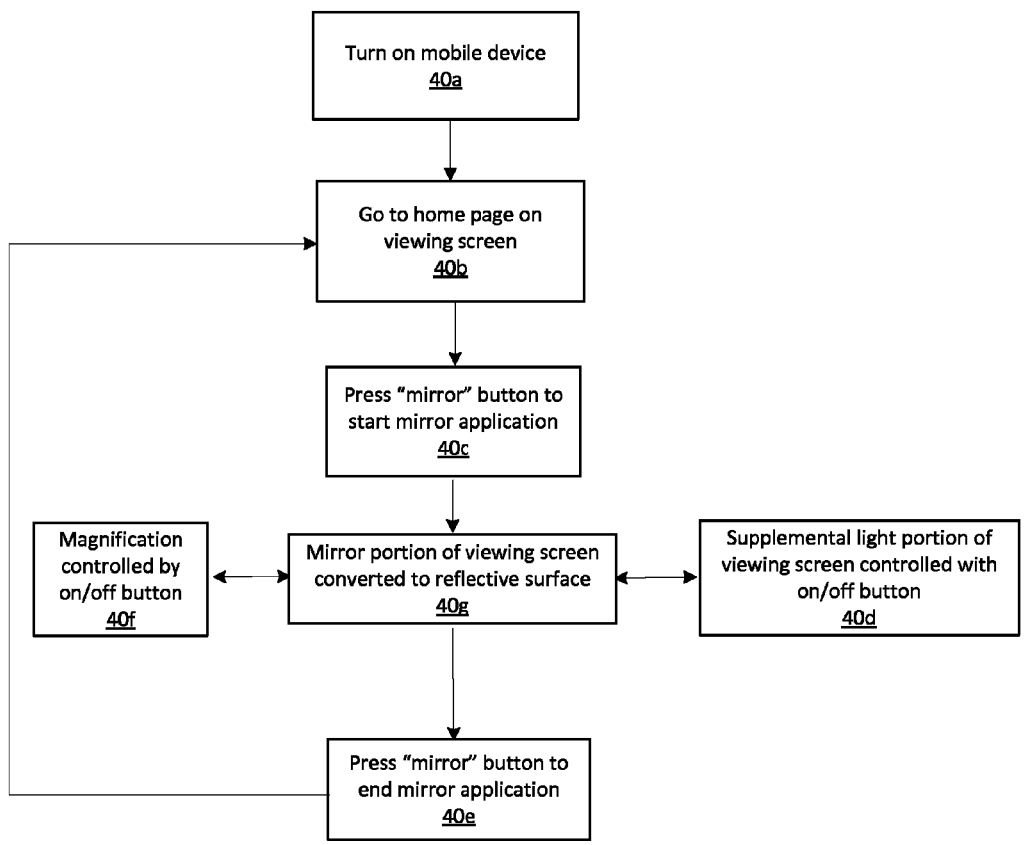
FIG. 2A is a diagrammatic illustration of a method of converting a smartphone or mobile device glass viewing screen into a mirror.
Figure 2B:
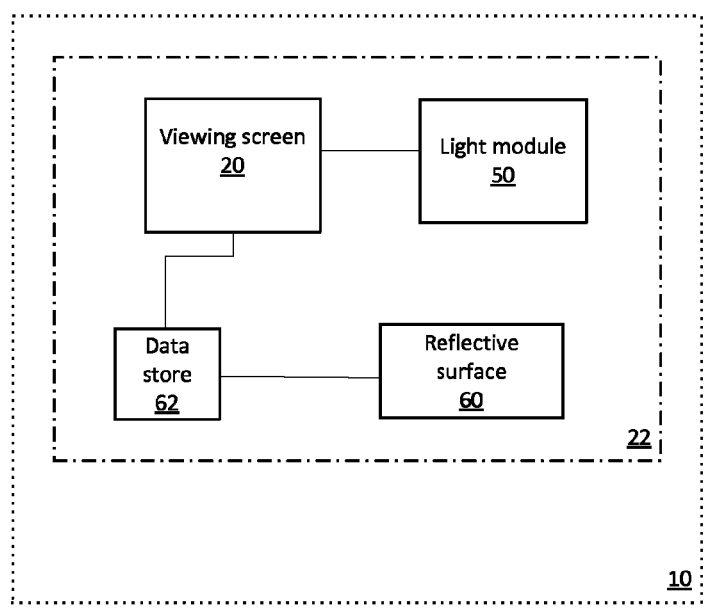
FIG. 2B is a diagrammatic illustration of a system for converting a smartphone or mobile device glass viewing screen into a mirror.
Figure 3A:
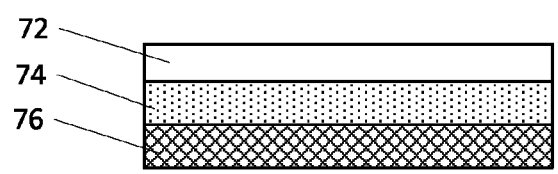
FIG. 3A is a cross sectional side view of a three layer mirror laminate according to the invention.
Figure 3B:
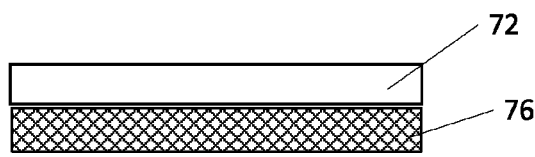
FIG. 3B is a cross sectional side view of a two layer mirror laminate according to the invention.

A mirror software application according to the invention is shown in FIGS. 1-2. The application causes the visual screen 20 of a mobile device 10 to create a conventional or a two-way mirror.

Understanding how conventional mirrors work allows the inventor much leeway in how to create a mirror application for a mobile device. The mirror application can be written so as to mimic the conventional mirror, by creating a reflective backing or mirror 60 behind the mobile device's glass screen 20, by altering the electromagnetic field of the light emitted by the screen itself to create a "light print", or some combination of both. The inventor notes that these are just two possible ways of creating a specular reflection, and that other methods are also possible. The inventor notes that many mobile devices uses liquid crystal displays, or LCDs, which change screen color by applying voltage across the plurality of liquid crystals in the display, changing their orientation so as to reflect light back out through the viewing screen to a viewer. Light is either allowed through, or reflected back, depending on the polarization of incoming light and the orientation of the liquid crystals themselves. Color is achieved using color filters.

In a first embodiment of the mirror application, the invention provides for controlled lighting 50 to be included with the mirror 60 so as to create a mirrored portion 60 in one or more areas of the viewing screen 20 only, and an array of bright light 50 around the perimeter of the screen to eliminate shadows around the image shown in the mirror that might otherwise misrepresent the image. The light feature of the mirror application is especially useful in low or poor lighting conditions.

In yet another embodiment of the mirror application, the application also features magnification and/or illumination of areas of the mirrored viewing screen along with regular resolution so as to allow both magnification and normal viewing in a single screen. This is particularly helpful for users who are near-sighted and require magnification but who may not need or want the entire viewing screen magnified.

To use the mirror application, a user must first turn on the mobile device 40*a* and go to the device's home page 40*b* on the viewing screen. On the screen, a mirror on/off button is touched 40*c* to start the mirror application. At this point, the viewing screen background display is converted to a highly reflective surface 40*g*. If the user wants the image in the mirror to be magnified, a magnification on/off button is touched 40*f*. If the user wants to illuminate the mirrored portion 60 of the mobile device 10, a light button is touched 40*d*, which turns on/off an array of lights around the periphery of the mirrored portion 60. To end the mirror application, the mirror button 40*c* is again touched and the viewing screen 20 returns to its normal function. In some embodiments (not shown), the mirror button 40*c* can be programmed to control lights and magnification, and in other embodiments (not shown) the mirror button can be programmed as a "kill switch" to turn off the lighting and magnification when the user wants to end use of the mirror application.

In a mirror invention of a second part, as shown in FIGS. 3A-5, a mirror laminate 70 is created using a top layer 72 comprising a reflective material, such as two-way mirror film, laminated to a bottom layer 76 comprising a flexible, clear optical plastic containing silicone. The mirror laminate 70 is removably electrostatically adhered to a front side of a surface of the viewing screen 20 so as to create a mirror. When the viewing screen is darkened, such as when the mobile device is off, or by turning off the screen, the mirror laminate 70 is a reflective surface serving as a true mirror.

The inventor notes that in current use, two-way mirror films are not removably reusable but are rather permanent applications to optical glass or other optically transparent, rigid, smooth materials. Optical plastics or vinyls however can be manufactured with silicone so as to create extremely thin, flexible plastics to which two-way mirror films can be permanently adhered during a manufacturing process creating a thin, flexible laminate that adheres to the viewing screen 20 by electrostatic adhesion and is removable and repositionable without glues or other special equipment, resulting in a flexible mirror. In yet another embodiment, shown in FIG. 4, the mirror laminate 70 is electrostatically adhered to a flat portion of a back side 40*e* of a mobile device case or to a removable mobile device case, creating a thin, useful mirror opposite the viewing screen 20.

The inventor also notes that a flexible, conventional mirror can also be achieved by creating a three layer laminate comprising of a bottom layer 76 comprised an optical plastic or vinyl material, a middle layer 74 comprised of a reflective flexible material such a metalized plastic laminate and a top layer 72 comprised of a thin optically transparent material, either a same material as the bottom layer 76, or another suitably flexible optically transparent plastic. Such a flexible mirror can be removably adhered to either the back of the mobile device case, or directly to the viewing screen. When used on the viewing screen itself, the laminate is simply adhered and removed as desired and can be rolled up (removed) or rolled down (positioned) as desired.

In yet another embodiment, another three layer mirror laminate is achieved using a switchable film, in which the film can be changed from optically transparent to opaque when electrical current is applied or removed to the film. The switchable film layer is typically a middle layer 74 in a laminate stack, sandwiched between the top two-way film layer 72 and the bottom flexible plastic or vinyl layer 76. Wiring to supply current to the switchable film layer is thin and can be applied along a perimeter of the mirror area, and connected to the mobile device's battery, or to a secondary power source, such as an external battery housed in an external device case. The wiring may be incorporated into the laminate itself, or applied externally to the laminate. The switchable film layer can, in some applications, be a selectively positioned layer of the mirror laminate, allowing a selective portion of the mirror laminate to function as a mirror, while allowing a remaining portion of the viewing screen to function normally (that is, lit), thus creating a convenient split-use screen. For instance, a user could apply an eyeliner makeup in the mirror portion of the screen while reading instructions on how to apply the eyeliner makeup from a website. Split-screen control can be achieved using software, controlled from the viewing screen front face (as in FIG. 1), or by push buttons such as those currently in use for volume control on a smartphone.

The inventor notes that dual or split-use screens with mirror applications currently do not exist due to an inherent physical property of a two-way mirror: a reflective or mirrored side of the mirror must be lit and an opposed side of the mirror must be dark in order for the reflective side to function as a mirror. Since switchable films require flowing current to create an optically opaque screen is well suited for this application, and in use typically requires a separately wired power source from that of the screen, as well as a separate power on/off control 78 to the switchable film so as to allow independent functioning of the screen and the switchable film. In some circumstances, a step up transformer may also be needed to provide adequate power to the switchable film. Wiring to supply current to the switchable film is typically housed in a frame, which can be as simple as wires housed in a plastic strip adhered a portion of the mirror laminate 70 and connected to the power supply 84.

The inventor believes that the lighting 50 about a perimeter of the mirror 60 or mirror laminate 70 can also be achieved using light-emitting diodes, or LEDs, for improved lighting about the mirror display. An LED array 80, in the Figures shown as a such as a plurality of LEDs 82 in a linear array, can be formed into strips conveniently housing the LEDs and all necessary electrical means, and backed with a sticky removable adhesive (not shown) allowing the LEDs 82 to be adhered to the viewing surface around the perimeter of the mirror laminate or just to an area around which a mirror function is desired. As shown in FIG. 5, power means 84 to the LED array is supplied by the mobile device's own battery, by a separate battery supply, such as button batteries contained in a separate mobile device case, or by a combination of both. Here, the term "power means" includes necessary wiring to connect the power supply to the components requiring current. The LED array 80 shown in FIG. 4 can also house electrically conductive wires or other suitable means to provide power to the mirror laminate embodiment having the switchable film layer. The LED array 80 may be oriented so as to emit light directly towards the viewer (as shown) or oriented sideways so as to emit light across the mirrored laminate surface. Ideally, the LED array 80 can be independently turned on and off with an on/off switch 86 separate from that of other components.

Figure 4:
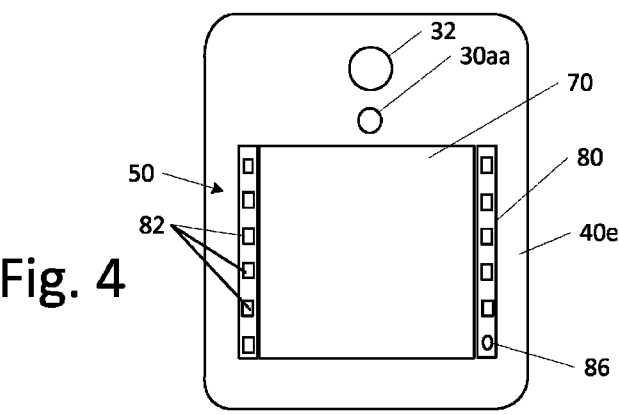
FIG. 4 is a back view of a mobile device case having a mirror laminate according to the invention affixed thereto.
Figure 5:
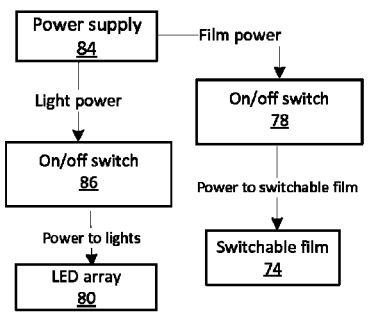
FIG. 5 is a diagrammatic illustration describing the electrical relationship of a power means to electrically powered components.

The inventor notes that while her mirror laminate 70 is ideally used directly affixed to the viewing screen 20 or as in FIG. 4, to the back side of the case or removable shell 40*e*.

In such an embodiment, the LED array 82 is directly housed in the case about the perimeter of the aperture for the viewing screen 20, said perimeter slightly flaring outwards so as to allow the LED array to be positioned to emit light across the viewing screen rather than directly outwards towards the viewer. In yet another embodiment, the case includes doors (not shown) that open away from the aperture into which the LED array is positioned so as to throw light upon the viewer's face and thus improve general lighting if needed.

The inventor notes that currently many mobile device users use a "selfie" mode of a camera application on their devices as a makeshift mirror, since the "selfie" mode application allows the user to see himself or herself in the viewing screen, and the image is a "light print" like that produced by the conventional mirror. However, the "selfie" mode application is a poor substitute for the mirror, because the light print produced by the "selfie" application is not in real time, and the image shown is actually time delayed by a few seconds. Application of lipstick, for instance, is a challenging endeavor using a "selfie" application, because the image shown on the visual screen may show the lipstick tube at the middle of the user's upper lip, but the user is aware that the lipstick is actually almost at the far right edge of her upper lip and hence it is mentally difficult to reconcile the difference between what is seen and what is manually being felt and performed. To apply the lipstick properly, the user has to stop to wait for the image shown in the viewing screen to "catch up", and this is why the inventor feels that the "selfie" mode is inadequate as compared to the mirror application according to the invention, where there is no time delay in the light print image shown in the mirrored portion of the viewing screen. The mirror application can be used in addition conjunction with the "selfie" application, allowing the user to check his or her image using the mirror application, then switch to the "selfie" application and back, as desired.

The inventor also notes that while she believes her mirror application to be most useful for mobile devices, such as smartphones, given that many laptop and even desktop computers have web cameras, and that video conferencing functionality exists in many computers, her mirror application is also useful for desktop computers, allowing the user to do a quick look in the mirror before entering the video conference without the inconvenience of going to a bathroom or finding a handheld mirror to do a final visual check. Both the invention of the first part (software) and the invention of the second part (laminate) can be used with a variety of electronic devices that are provided with a smooth and rigid surface to which an electrostatic film can adhere, and in the embodiment of the mirror laminate 70 having a switchable film layer, an adequate power supply and wiring is needed so as to independently supply current to the laminate separate from other features of the device itself.

It is to be understood that the above-described arrangements are only illustrative of the application of the principles of the present invention. Numerous modifications and alternative arrangements may be devised by those skilled in the art without departing from the scope of the present invention.

What is claimed is:

1. A mirror laminate for use with a mobile device, the mobile device having a viewing screen and an outer case having a back side, the mirror laminate comprising:
   a reflective top layer; and
   an optically transparent bottom layer laminated to the reflective top layer,
   wherein the bottom layer is at least one of a flexible plastic layer and a flexible vinyl layer and is electrostatically charged;
   whereby the mirror laminate is removably electrostatically adhered to at least one of the viewing screen and the outer case; and
   a middle layer sandwiched between the top layer and the bottom layer,
   wherein said middle layer is a switchable film, and
   further comprising power means to supply current to the middle layer;
   wherein supplying current to the middle layer creates an optically opaque laminate and removing current to the middle layer creates an optically transparent laminate.

2. The mirror laminate of claim 1, wherein power means to supply current to the middle layer is comprised of electrical wires housed in a frame adhered to the mirror laminate.

3. The mirror laminate of claim 1, wherein power means to supply current to the middle layer is controlled by a switch.

4. The mirror laminate of claim 1, wherein the middle layer is applied to a portion of the laminate, such that the mirror laminate is three layers thick in the portion and two layers thick in another portion.

5. The mirror laminate of claim 1, further comprising an LED array strip adhered to a perimeter of the viewing screen.

6. The LED array strip of claim 5, wherein said strip houses electrical power and supply means.

7. The LED array of claim 5, wherein current to the array is controlled by a switch.

* * * * *